INVENTOR.
CHARLES J. BADEWITZ
BY Knox & Knox

Aug. 22, 1967  C. J. BADEWITZ  3,337,867
TERRAIN SLOPE OR PITCH AND ROLL COMPUTER
Filed June 13, 1966  2 Sheets-Sheet 2

INVENTOR.
CHARLES J. BADEWITZ
BY
Knox & Knox

United States Patent Office 3,337,867
Patented Aug. 22, 1967

3,337,867
TERRAIN SLOPE OR PITCH AND ROLL COMPUTER
Charles J. Badewitz, San Diego, Calif., assignor to The Ryan Aeronautical Co., San Diego, Calif.
Filed June 13, 1966, Ser. No. 556,993
5 Claims. (Cl. 343—7)

ABSTRACT OF THE DISCLOSURE

The apparatus utilizes multiple radar beams radiating from a vehicle in flight to the terrain below, the slant ranges along the beams being measured and compared to determine the attitude of the vehicle relative to the terrain surface, and further compared with a vertical reference to compute the terrain slope, the computer incorporating a zero reference related to the divergence angles of the beams, so that any deviation from the zero reference directly represents the terrain slope by a signal of very simple and readily usable form, with a minimum of computation.

---

The present invention relates to radar and specifically to a terrain slope or pitch and roll computer.

Multiple beam radar systems have been used in aircraft and other airborne vehicles for navigational and other purposes. Speed and direction of travel above a surface can be measured by comparing the Doppler shift of signals in several divergent beams, while altitude can be measured by the delay of a reflected signal. My copending application Ser. No. 519,755, filed Jan. 10, 1966 and entitled, Verticality, Altitude and Velocity Sensing Radar, discloses a system which accomplishes the aforementioned functions and additionally determines the verticality or attitude of a vehicle relative to the surface below.

The system disclosed herein utilizes multiple beam radar to determine automatically, in a very simple manner, the attitude of a vehicle with respect to the surface below in relaion to the pitch and roll axes of the vehicle. With a vertical reference, such as a stable platform, in the vehicle, the data obtained will indicate the degree and direction of slope of the terrain surface. The system may be used for such purposes as terrain contour mapping, examination of the surface to determine suitable landing sites, or even attitude control of a vehicle. Computation of the data is simplified by incorporating into the circuitry a zero reference related to the divergence pattern of the radar beams, so that differences in the signals produced by the beams will provide data which is readily converted to the required form with a minimum of apparatus.

The system and its functions are illustrated in the drawings, in which.

Figure 1:
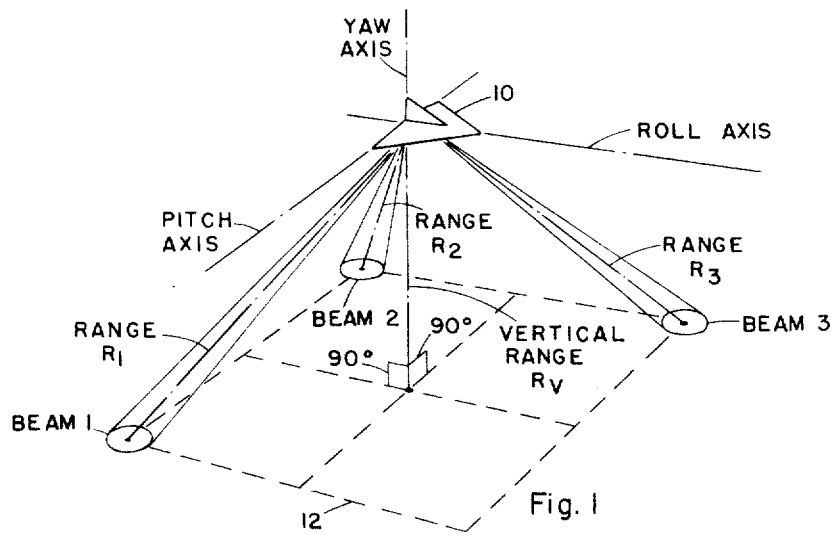
FIGURE 1 is a diagram of the basic multiple beam pattern in relation to the vehicle and terrain surface.

The beam pattern, as illustrated in FIGURE 1, utilizes three beams arranged with one beam directed to the rear and right of a vehicle 10, another beam directed to the rear and left of the vehicle and the third beam directed forward and to the left. The beams, which are numbered 1, 2 and 3 for purposes of description, illuminate a level surface below the vehicle substantially at three corners of a square or rectangular zone 12. All of the beams are at known fixed angles of divergence from the vehicle, the rear beams 1 and 2 diverging at equal angles on opposite sides of the yaw axis or vehicle vertical axis, which passes through the center of the zone 12. Similarly the divergence angles of beams 2 and 3 from vehicle vertical are equal, in order to simplify computation. The longitudinal or roll axis and the lateral or pitch axis of the vehicle are orthogonal with the vertical axis.

Figure 3:
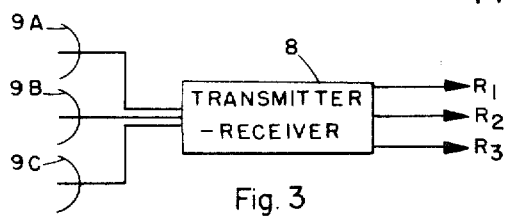
FIGURE 3 is a diagram of a typical radar system.

Any suitable radar and antenna system may be used in the vehicle, with the three beams in simultaneous continuous operation, or scanned sequentially from separate antennas or a common antenna, all of these arrangements being well known. The basic data from the radar comprises the slant ranges measured along the individual beams between the vehicle and the terrain, as in the above mentioned copending application. A typical arrangement is illustrated in FIGURE 3, for reference purposes, a conventional transmitter-receiver unit 8 being coupled to three antennas 9A, 9B and 9C to measure the slant ranges $R_1$, $R_2$ and $R_3$ along the respective beams, which range signals constitute the inputs for the system to be described.

Figure 2:
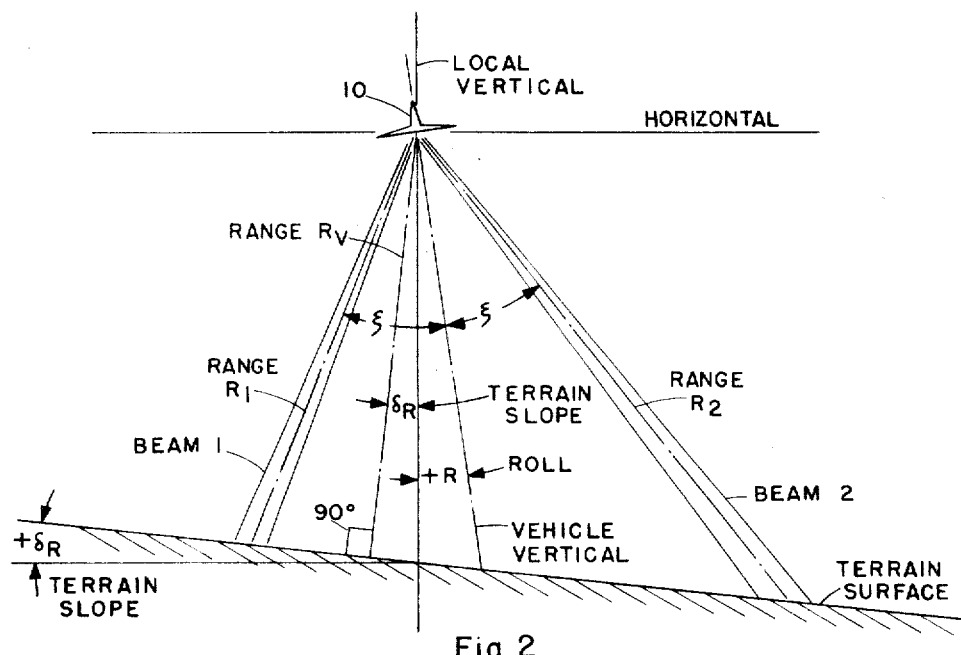
FIGURE 2 is a diagram showing the geometry involved in the condition of a vehicle having a roll deviation with respect to sloping terrain.

In FIGURE 2 the vehicle 10 is viewed head on, or with the roll axis perpendicular to the plane of the paper, the rear beams 1 and 2 being utilized and the forward beam 3 omitted for clarity. To facilitate description the vehicle is shown with a roll deviation over a sloping terrain surface. The axes of beams 1 and 2, along which ranges $R_1$ and $R_2$ are measured, diverge at equal angles $\epsilon$ on opposite sides of the vehicle vertical, and a roll angle R is indicated between the vehicle vertical and local vertical, the latter being a radius of a planetary body. In addition there is a terrain slope angle of $\delta R$ between local vertical and a vertical to the terrain surface. The roll angle and terrain slope are indicated as plus quantities, since their deviations from level vehicle and level terrain relation are additive. Actual altitude or vertical range $R_V$ of the vehicle above the terrain is measured along the terrain vertical.

The geometry for deviation in the pitch plane is similar, with pitch angles used instead of the roll angles shown in FIGURE 2. For pith computations the radar beams involved would be beam 3 and either of beam 1 or beam 2.

From FIGURE 2 it can be seen that:

$$R_V = R_2 \cos(\epsilon + R + \delta_R)$$
$$R_V = R_1 \cos(\epsilon - R - \delta_R)$$

or $$R_2 \cos(\epsilon + R + \delta_R) = R_1 \cos(\epsilon - R - \delta_R)$$

where the sign of R is plus as shown.

Figure 4:
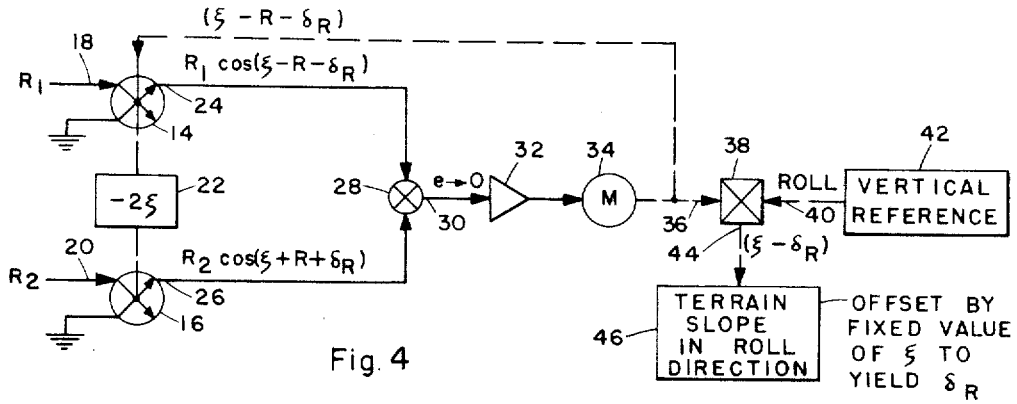
FIGURE 4 is a circuit diagram showing the computation of actual terrain slope in the roll direction.

The computation for terrain slope in the roll direction is performed by a servo type unit illustrated in FIGURE 4. A pair of resolvers 14 and 16 have inputs 18 and 20, respectively, which receive input signals proportional to the measured slant ranges $R_1$ and $R_2$. The resolvers are interconnected by a zero reference unit 22 which sets the electrical zero of the resolvers at an angular difference corresponding to the divergence angle of beams 1 and 2. Techniques for offsetting or biasing resolvers to any desired neutral or zero position are well known, the most common method being a mechanical angular offset of the two resolver shafts, which are usually connected by gear trains. Outputs 24 and 26 of resolvers 14 and 16 are connected to a mixer 28 which has an output 30 providing an output error voltage $e$. This output signal is amplified by an amplifier 32 to drive a motor 34, which is mechanically coupled to the resolvers 14 and 16 in a servo loop to drive the resolvers to a null position dependent on the signal $e_0$. Motor 34 is also connected to one input 36 of a differential 38, the other input 40 of which receives a signal from a vertical reference 42, such as a stable platform. The output 44 of differential 38 is coupled to a utilization device 46, which may be a direct indicator, a recorder, or some form of control for corrective purposes.

The resolver outputs are proportional to the vertical range $R_V$ derived from the slant range along each beam according to the above equations. If the two range signals $R_1$ and $R_2$ are equal the output $e_0$ will be zero, since the roll and slope angles will either be each equal to zero or equal in amplitude but opposite in sense. If the latter is the case the roll deviation will be detected by the vertical reference 42 and applied to differential 38, whose output then becomes $\epsilon - \delta_R$. Since the divergence angle is a known fixed value the utilization device 46 is offset or compensated for this, the final signal representing the terrain slope angle in the roll direction, $\delta_R$.

If the range signals $R_1$ and $R_2$ are not equal the servo will null to an output angle of $(\epsilon - R - \delta_R)$ proportional to the difference in the two measured ranges. Again, by subtracting the roll deviation from the vertical reference and applying the divergence angle compensation to the utilization device, the actual terrain slope is derived.

Figure 5:
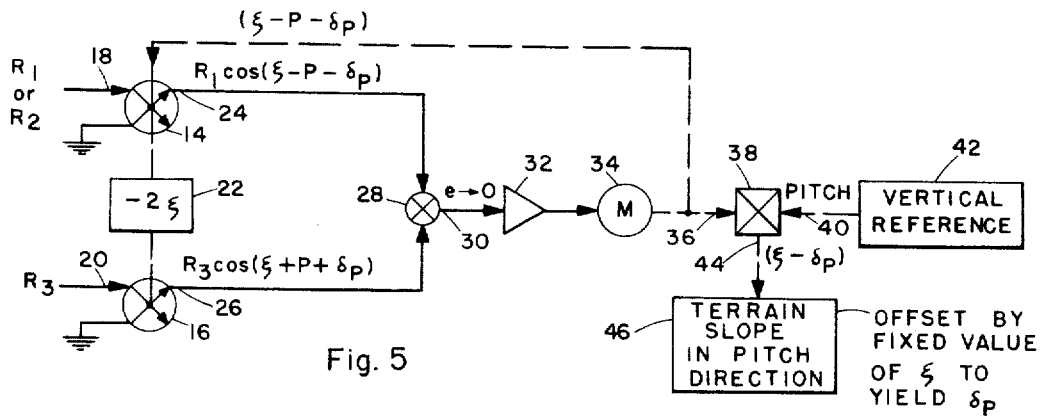
FIGURE 5 is a circuit diagram showing the computation of actual terrain slope in the pitch direction.

Terrain slope in the pitch direction is obtained in a similar manner, as shown in FIGURE 5. To illustrate the similarity the components of the servo unit are identified by the same numerals as in FIGURE 4, the only difference being in the resolver inputs which now comprise the slant range from beam 3 to resolver 16 and the slant range from either of beam 1 or beam 2 to resolver 14. The same circuit may, in fact, be used for both roll and pitch computations by applying the appropriate range inputs sequentially. Or duplicate circuits may be used for simultaneous operation. Pitch angles are substituted for roll angles in each instance and the vertical reference applies a pitch compensation, if any, to the differential, resulting in a final signal at the utilization device corresponding to terrain slope $\delta_P$ in the pitch direction.

Figure 6:
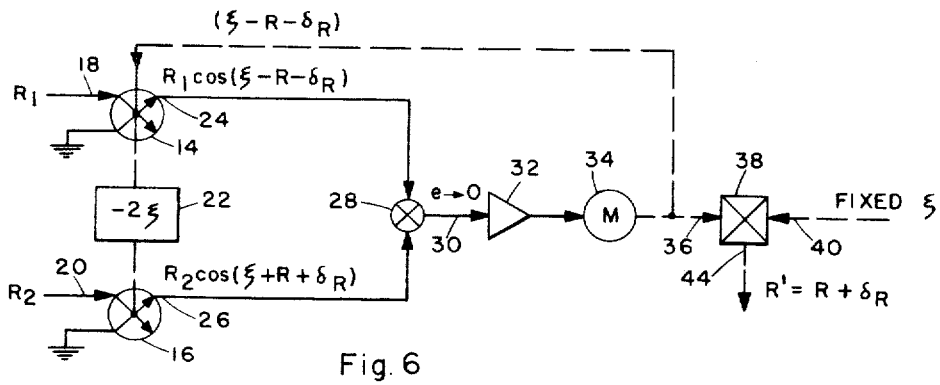
FIGURE 6 is a circuit diagram showing computation of vehicle roll relative to terrain surface.

To determine the roll of the vehicle relative to the terrain surface, regardless of terrain slope, the same basic circuitry is used but without the vertical reference, as in FIGURE 6. Instead the input 40 of differential 38 is offset by a value corresponding to the fixed beam divergence angle $\epsilon$. The differential output 44 then provides a signal $R'$ corresponding to the roll angle and terrain slope, if any, no separation of these being necessary since it is the relative angle which is of interest.

Pitch angle relative to the terrain surface is obtained from the same circuit by substituting the pitch data for the roll data, in the manner that FIGURE 5 differs from FIGURE 4.

Over level terrain or water the roll and pitch deviations will be measured relative to local vertical and may be used to provide a vertical reference if needed. The signals obtained may be used to actuate a stabilizing or erecting system to control the vehicle in any well known manner.

It will be evident that the simple expedient of providing the resolvers with a predetermined zero position corresponding directly to the beam divergence angles, the initial input data is automatically transposed to an immediately useable form without special stages of computional circuitry. In its simplest form the differential could be a mechanical type working with the actual angular displacements involved.

It is understood that minor variation from the form of the invention disclosed herein may be made without departure from the spirit and scope of the invention, and that the specification and drawings are to be considered as merely illustrative rather than limiting.

I claim:
1. In a flight vehicle, the combination of:
   radar apparatus having means to radiate signals in a plurality of beams downwardly directed at known angles of divergence from the vertical axis of the vehicle, means to receive the reflected signals and provide range signals corresponding to the slant ranges measured along individual beams between the vehicle and a surface below;
   and computer means including a pair of resolvers having inputs connected to receive range signals from a selected pair of said beams;
   zero reference means connected to said resolvers and offsetting the resolvers to relative angular positions corresponding to the divergence angles of the selected pair of beams;
   said resolvers having outputs providing signals corresponding to the apparent vertical ranges from the vehicle to the surface with respect to the measured slant ranges;
   (1) a mixer connected to said resolver outputs and providing an output angle signal corresponding to the sum of the divergence angle of the selected beams and the angular deviation between the vehicle and the surface substantially in the plane of the selected beams;
   a motor driven by said output angle signal, said motor being coupled to said resolvers to null the resolvers in accordance with the output angle signal.

2. Apparatus according to claim 1, and including means to subtract from said output angle signal the beam divergence angle and the deviation angle of the vehicle relative to local vertical, whereby the remaining signal represents the slope of the surface relative to local vertical.

3. Apparatus according to claim 2, wherein said last mentioned means includes a differential having one input driven by said output angle signal and a second input coupled to a source of vertical reference, whereby the output of said differential provides the surface slope signal.

4. Apparatus according to claim 1, and including means to subtract from said output angle signal the beam divergence angle, whereby the remaining signal represents the deviation angle between the vehicle and the surface.

5. Apparatus according to claim 4, wherein said last mentioned means includes a differential having one input driven by said output angle signal and a second input driven by a signal proportional to the beam divergence angle, whereby the output of said differential represents said deviation angle.

No references cited.

RODNEY D. BENNETT, *Primary Examiner.*

C. L. WHITHAM, *Assistant Examiner.*